3,393,092
HIGH ENERGY DENSITY BATTERY (LICAD)
Manuel Shaw, Los Angeles, and Donald H. McClelland, Canoga Park, Calif., assignors to Whittaker Corporation, Los Angeles, Calif., a corporation of California
No Drawing. Filed Feb. 28, 1966, Ser. No. 530,320
10 Claims. (Cl. 136—6)

ABSTRACT OF THE DISCLOSURE

A novel secondary battery comprising at least one cadmium fluoride positive plate, at least one negative plate having a composition selective from the group consisting of Group I, Group II and Group III metals, said plates being disposed in an electrolyte comprising an organic solvent selected from the group consisting of those having the carbonyl group, the thiocarbonyl group, and the cyano group, and having dissolved therein a fluoride-containing salt.

---

This invention relates to a novel high energy density secondary battery comprising a Group I, II or III metal negative plate and a cadmium fluoride positive plate which the electrolyte contains certain classes of organic solvents and inorganic fluoride-containing salts as more fully hereinafter described.

Previously, it has been suggested to use lithium metal as a negative plate in a battery. While various plates have been suggested for use with the lithium, we are unaware of the use of a lithium negative plate combined with a cadmium fluoride positive plate. Likewise, it is not heretofore been known to use a lithium negative plate and a cadmium fluoride positive plate in conjunction with an electrolyte containing organic solvents and inorganic salts. Moreover, ours is the first high energy density battery which makes use of a cadimum fluoride positive plate.

A wide variety of primary and secondary batteries are already known to the art. However, the requirements posed by manned space travel have rendered many known batteries unacceptable for a number of reasons. First, in space, weight must be kept to an absolute minimum. Thus, any power source, such as a battery, used in space must provide a high energy to weight ratio. Secondly, the battery must be capable of maintaining this performance over a prolonged period, and preferably should be rechargeable without drop off in performance. Many chemical couples have been suggested for use in batteries as possibly fulfilling these stringent criteria. Nevertheless, no prior system has, on balance provided all of the needed characteristics in high degree.

Accordingly, it is a principal object of the present invention to provide a novel high energy density secondary battery, that is, a lightweight battery capable of delivering high current.

More particurarly, it is an object of the present invention to provide a novel secondary battery having a lithium negative plate and cadmium fluoride positive plate in which the electrolyte contains various organic solvents and inorganic salts.

A further object of the present invention is to provide a novel high energy density secondary battery capable of being repeatedly discharged and recharged.

Still another aspect of the present invention is to provide a secondary battery wherein the plates exhibit excellent stability during the discharging and charging cycle.

These and other objects of the present invention will be apparent from the more detailed description which follows.

Briefly, the present invention comprises a novel high energy density storage secondary battery having a cadmium fluoride positive plate and a Group I, II or III metal negative plate wherein the electrolyte contains an organic solvent having a carbonyl, thiocarbonyl or cyano group, and an inorganic fluoride-containing salt.

As will be immediately apparent to those skilled in the art, the present battery represents a substantial departure from any of the batteries of the prior art. In the present invention it should be noted that the cadmium fluoride represents the material of the positive plate. This represents a substantial modification from the various cadmium batteries of the prior art wherein cadmium metal or cadmium oxide has been used as the negative plate. We have found that the cadimum fluoride positive plate batteries of the present invention using lithium as the negative plate have an energy of 400 wh./lb. and a voltage of about 2.7 volts. It has been found that the cadmium fluoride positive plate is very stable in the organic solvents utilized as the electrolyte and hence possesses long life. In addition, the electro-chemical reversibility of both the lithium and cadmium fluoride electrodes make the battery well adapted for recharging.

In general, the positive and negative plates of the battery of this invention are assembled in conventional fashion. This generally involves arranging alternating layers of positive plate material, separator material and negative plate material in a stacked configuration. This assembly is adapted to be received in any common battery case capable of containing the electrolyte. Obviously, any number of pairs of plates can be assembled in this manner, and connected in parallel or series, to achieve the desired voltage and/or amperage output. The particular arrangement of the battery components forms no part of this invention.

The positive plate may be prepared in a variety of ways. These methods include pasted plate, sintering, impregnaton of nickel plaques and direct chemical or electrolytic formation methods. Various methods of incorporating active material as fluorine, as some other cadmium compound, or as cadmium metal are also suitable. For example, the cadmium fluoride can be prepared by the action of hydrogen fluoride or ammonium fluoride on cadmium oxide, or by the direct fluorination of powdered cadmium with fluorine. Methods of incorporating active material as other cadmium compounds and conversion to the fluoride in situ include impregnating standard battery cadmium oxide plates with aqueous or anhydrous hydrogen fluoride, aqueous ammonium fluoride, impregnating nickel plaques with cadmium nitrate followed by ammonium fluoride, and direct fluorination of standard charged cadmium plates using fluorine. The cadmium plates can also be prepared according to dry pressed, pasted plate, or impregnated nickel plaque techniques.

The positive cadmium fluoride plate may also contain various plate additives such as carbon and powdered metals, to improve the discharging rate and for other purposes as will be apparent to those skilled in the art. To date it has been found that the presence of from 5 to 10% by weight of carbon in the positive plate provides optimum results in discharging. Likewise, silver and cadmium metal powder in an amount up to about 5% has been found to improve the discharge characteristics of the plate.

The lithium plates may be prepared, for example, from 0.015 inch ribbon obtained from Foot Mineral Company. Plaques of the ribbon are cut and pressed onto grids in conventional fashion. No further preparation is necessary.

Various separator materials may be utilized including non-woven nylon and fiberglass cloth. If desired, the cell may be placed in a cell case. Ordinarily an aluminum cell case is not too practical because it tends to corrode. However, an aluminum cell case may be made suitable by coating the inside thereof with nylon, Teflon, or by wrapping the active cell components before insertion in the cell. The wrapping material can be a thin film of nylon, Teflon, or other essentially inert materials.

The following example is presented solely to illustrate the invention and should not be regarded as limiting in any way. In the example, the parts and percentages are by weight unless otherwise indicated.

EXAMPLE

A cell was constructed of a single plate of cadmium fluoride sandwiched between two lithium plates utilizing nylon separators, the entire assembly being contained in a heat sealed polyethylene bag. The electrolyte was potassium hexafluorophosphate in propylene carbonate. The positive plates were prepared in one of two ways. Either by pasting the cadmium fluoride-carbon mix on nickel expanded metal, or impregnating sintered nickel plaques with an ammoniacal solution of cadmium fluoride. The fabricated cell is subjected to cycle testing. In one test for 21 cycles at 5 ma./sq. in. a plateau voltage of 2.0 volts was obtained. Best results were obtained with the impregnated plates. Positive plate efficiencies of from 17 to 42% were obtained.

The foregoing experiment was repeated utilizing butyrolactone in lieu of propylene carbonate. Similar results were obtained.

Three plates were analyzed for total cadmium content after discharge and compared with the amounts originally present. There was no apparent change in cadmium content even though the discharge took three days. This indicates that the cell has an excellent shelf life. The free energy of formation of cadmium fluoride is minus 153 kcal./mole, and thus has excellent stability, very little oxidizing power toward organic compounds, and little or no side reactions resulting in self-discharge.

As has been indicated above the electrolytes to be used with the lithium-cadmium fluoride battery include mixtures of certain classes of solvents and salts.

The solvents used in the practice of our invention are those having the following functional groups.

Class I solvents:

(Carbonyl)

Class II solvents:

(Thiocarbonyl)

Class III solvents:

(Cyano)

More completely described:

Class I solvents (A) Ketones:
Compounds having the structure

where $R_1$ or $R_2$ represent any of the alkyl groups (methyl, ethyl, propyl, butyl, amyl, etc.).

Example:

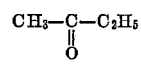

Methyl ethyl ketone (B) Esters:
Compounds having the structure

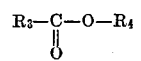

where $R_3$ and $R_4$ represent any of the alkyl groups.

Example:

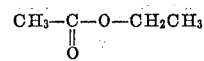

Ethyl acetate

R may also be replaced by H (hydrogen atom) to give

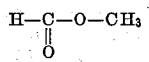

Included in this group are the cyclic esters such as the lactones.

Example:

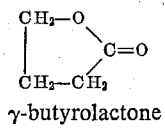

γ-butyrolactone (C) Carbonates:
Compounds having the structure

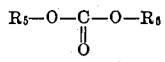

where $R_5$ and $R_6$ represent alkyl groups.

Example:

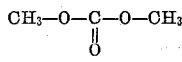

Dimethyl carbonate

Included in this group are the cyclic carbonates.

Example:

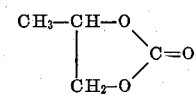

Propylene carbonate

Class II solvents (A) Sulfoxides (ketonic type):
Compounds having the structure

where $R_7$ and $R_8$ represent alkyl groups.

Example:

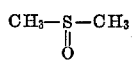

Dimethyl sulfoxide

This group also includes the cyclic oxides.

Example:

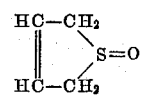

Thiophene-1-oxide (B) Sulfones (ketonic type):
Compounds having the structure

where $R_9$ and $R_{10}$ represent alkyl groups.

Example:

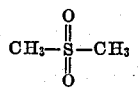

dimethyl sulfone

This group also includes the cyclic structures.

Example:

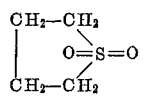

tetrahydrothiophene, 1-1 dioxide (C) Sulfinic esters:
Compounds having the structure

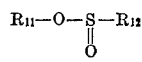

where $R_{11}$ and $R_{12}$ represent alkyl groups.

This group includes the cyclic sulfinic esters.

(D) Sulfonic esters:
Compounds having the structure

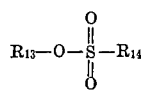

where $R_{13}$ and $R_{14}$ are alkyl.

(E) Sulfites:
Compounds having the structure

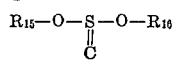

where $R_{15}$ and $R_{16}$ are alkyl.

(F) Sulfates:
Compounds having the structure

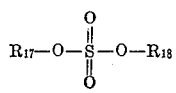

where $R_{17}$ and $R_{18}$ are alkyl.

Class III solvents

Compounds having the structure
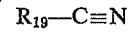
where $R_{19}$ is alkyl.
Example:

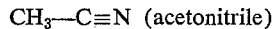

In addition to the above mentioned solvents, the electrolyte may contain any of those types of solutes containing an atom reversible with respect to the cadmium fluoride positive plate, namely fluoride-containing compounds. These consist of the following clases of solutes.

Simple fluorides: Compounds of the type $MF_m$ where M represents any metal ion, normally from the Group I–VIII of the Periodic Table.

Examples:

LiF, KF, $CaF_2$, etc.

Complex fluorides may also be used including:

| $MPF_4$ | $M_2BeF_4$ | $M_2SF_7$ | $MTeF_7$ |
| $MPF_6$ | $M_3AlF_6$ | $MMgF_3$ | $MSeF_7$ |
| $MPOF_4$ | $MSO_2F_3$ | $M_2GeF_6$ | $M_2ZrF_6$ |
| $MBF_4$ | $M_2SF_6$ | $M_2SiF_6$ | $M_2SeF_6$ | where M is as defined above.

The negative plate is preferably lithium. However, any of the metals from Group I, II or III are also suitable in the practice of this invention including calcium and aluminum.

As will be immediately apparent to those skilled in the art, the battery of the present invention is characterized by excellent rechargeability, shelf life, and high energy density. Accordingly, this battery will find wide application for use in space vehicles, air planes, land vehicles, and in stationary power sources. Because of the long life of the battery, it will be found to be very economical in many applications and will permit the wider use of battery power than has been heretofore attainable.

Having fully described the invention it is intended that it be limited only by the lawful scope of the appended claims.

We claim:
1. A novel secondary battery comprising at least one cadmium fluoride positive plate, at least one negative plate having a composition selected from the group consisting of Group I, Group II and Group III metals, said plates being disposed in an electrolyte comprising an organic solvent selected from the group consisting of those having the carbonyl group, the thiocarbonyl group, and the cyano group, and having dissolved therein a fluoride-containing salt.
2. The battery of claim 1 wherein a plurality of said plates are disposed in a battery case for said electrolyte.
3. The battery of claim 1 wherein the fluoride-containing salt is a simple fluoride salt.
4. The battery of claim 1 wherein the fluoride-containing salt is a complex fluoride salt.
5. The battery of claim 1 wherein the organic solvent contains a carbonyl group.
6. The battery of claim 1 wherein the organic solvent is a nitrile.
7. The battery of claim 1 wherein the organic solvent contains a thiocarbonyl group.
8. The battery of claim 1 wherein the negative plate is lithium.
9. The battery of claim 1 wherein the organic solvent contains a carbonyl group and is selected from the group consisting of ketones, esters and carbonates.
10. The battery of claim 1 wherein the organic solvent contains a thiocarbonyl group and is selected from the group consisting of sulfoxides, sulfones, sulfinic esters, sulfonic esters, sulfites, and sulfates.

References Cited

UNITED STATES PATENTS

| 3,043,896 | 7/1962 | Herbert et al. | 136—6 |
| 3,098,770 | 7/1963 | Horowitz et al. | 136—100 |
| 3,185,590 | 5/1965 | Mayer et al. | 136—6 |
| 3,279,952 | 10/1966 | Minnick | 136—83 |

WINSTON A. DOUGLAS, *Primary Examiner.*

ALLEN B. CURTIS, *Examiner.*

C. F. LEFEVOUR, *Assistant Examiner.*